Nov. 22, 1960  D. R. TANGUY  2,961,600

ELECTRICAL WELL LOGGING APPARATUS

Filed Oct. 30, 1956  2 Sheets-Sheet 1

INVENTOR.
DENIS R. TANGUY
BY William R. Sherman
HIS ATTORNEY

Nov. 22, 1960 D. R. TANGUY 2,961,600
ELECTRICAL WELL LOGGING APPARATUS
Filed Oct. 30, 1956 2 Sheets-Sheet 2

INVENTOR.
DENIS R. TANGUY
BY
William R. Sherman
HIS ATTORNEY

2,961,600

ELECTRICAL WELL LOGGING APPARATUS

Denis R. Tanguy, Houston, Tex., assignor, by mesne assignments, to Schlumberger Well Surveying Corporation, Houston, Tex., a corporation of Texas Filed Oct. 30, 1956, Ser. No. 619,275

14 Claims. (Cl. 324—1)

The present invention relates to electrical well logging apparatus and more particularly to new and improved apparatus useful in making highly localized measurements of the electrical resistivity of the material lying near to the sidewall of a borehole drilled into the earth.

In several electrical logging techniques now in widespread commercial use, electrodes are inlaid in the insulating face of a carrier or pad for electrical contact with the sidewall of a borehole as the carrier is moved along the borehole. The insulation afforded by the face of the carrier tends to confine the flow of current from the electrodes to a path extending outwardly into the adjacent formations, while good conformance of the carrier face to the sidewall serves to exclude well fluid from the region of contact between the carrier face and the sidewall. Although a flexible construction for the electrode carrier has been adopted which ensures a good physical contact under most wall conditions, an enlargement of the contact area of the face would be desirable but for the difficulty of retaining a good physical and electrical contact. In particular, it would be desirable effectively to increase the transverse dimension of the carrier face, yet a good electrical barrier between the volume of the formation being measured and the well fluid is difficult to establish with a carrier face of enlarged transverse dimension due to wide variations in the radius of curvature of the borehole wall.

It is an object of the invention, accordingly, to provide new and improved well logging apparatus in which the electrical barrier is effectively extended beyond the face of an electrode carrier.

Another object of the invention is to provide new and improved well logging apparatus for obtaining highly accurate formation resistivity measurements of formations adjacent a borehole despite irregularities in the borehole wall.

A further object of the invention is to provide new and improved well logging apparatus for obtaining highly accurate measurements of formation resistivity substantially free from errors arising from an undesired flow of currents between an electrode and ground.

Yet another object of the invention is to provide new and improved electrical well logging apparatus of the foregoing character in which the accuracy of resistivity measurements is enhanced by controlling the potential distribution in the vicinity of measuring electrodes.

According to the invention, an electrode carrier adapted for traversing a borehole has inlaid in its non-conductive, wall conforming face an inner current emitting electrode and, arranged about said inner electrode, an outer current emitting electrode and a potential measuring electrode. Means are provided for bringing the potential of the outer electrode, which is spaced near the perimeter of the carrier face to substantially the same potential as the potential of the measuring electrode. By disposing the potential measuring electrode inwardly from the perimeter of the carrier face, a distribution of potentials about the inner electrode is obtained dependent upon the potential picked up by the measuring electrode and corresponding to an effectively large insulating barrier between the portion of the formations undergoing measurement and any conductive fluid contained within the borehole. Potentials picked up for determining formation resistivity serve to provide highly accurate measurements as a result of controlling the potential distribution.

In one embodiment of the invention, the potential of the outer electrode is made substantially equal to the potential of the measuring electrode by passing current between the outer electrode and a remote current return point in response to the potential of the measuring electrode with respect to a remote reference point. In another embodiment, a portion of the current emitted from the outer electrode is determined by the potential gradient between the inner and outer electrodes to control the potential distribution. Different resistivity measurements are obtained corresponding to the respective modes of controlling the potential distribution.

The invention and others of its objects and advantages will be better perceived from the following detailed description of typical embodiments thereof, taken in conjunction with the accompanying drawings, in which.

Figure 1:
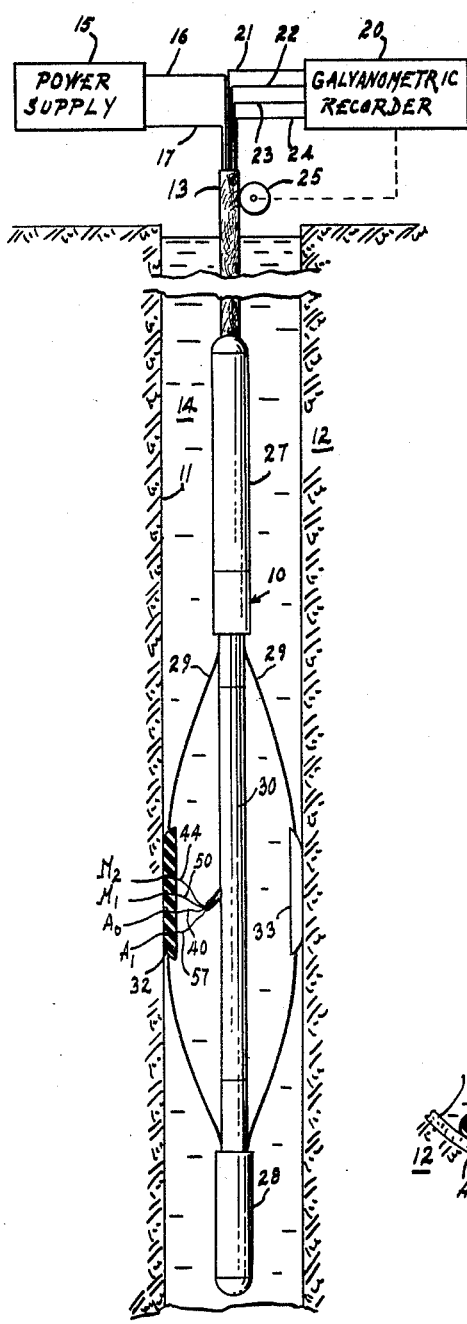
Fig. 1 is a schematic diagram, partially in longitudinal section, showing typical well logging apparatus constructed according to the invention, in position in a borehole drilled into the earth.

In Fig. 1 is shown an elongated housing 10 which is adapted for travel through a borehole 11 past formations 12 as a supporting multiconductor cable 13 is raised and lowered in the well by suitable means (not shown) located at the surface of the earth. The borehole 11 usually contains a column of more or less conducting liquid 14.

At the surface of the earth, there may be provided a suitable power supply 15 having its output terminals connected to cable conductors 16, 17, and a galvanometric recorder 20 or other means for utilizing measure signals deriving from the subsurface apparatus. The recorder 20 may, for example, be of the multichannel type conventionally employed in well logging operations and having the input terminals for one channel connected to conductors 21, 22 and having another pair of input terminals connected to cable conductors 23, 24. So that the indications provided by recorder 20 may be recorded as a function of depth of the housing 10 in the borehole, its record may be advanced by means such as the measuring wheel 25 engaged by the cable 13.

The housing 10 includes a pressure-resistant cartridge 27 for containing electrical components of the subsurface apparatus and a carrier supporting assembly 28 secured dependently to the cartridge 27. A plurality of bowed springs 29 suitably mounted on elongated frame 30 of the assembly 28 carries a wall engaging electrode carrier or pad 32 and, diametrically opposite the carrier, a wall engaging back-up plate 33. Like ends of the bowed springs 29 may have a limited travel to allow flexing to accommodate variations in borehole diameter while resiliently urging the carrier 32 into firm contact with the sidewall of the borehole.

Figure 2:
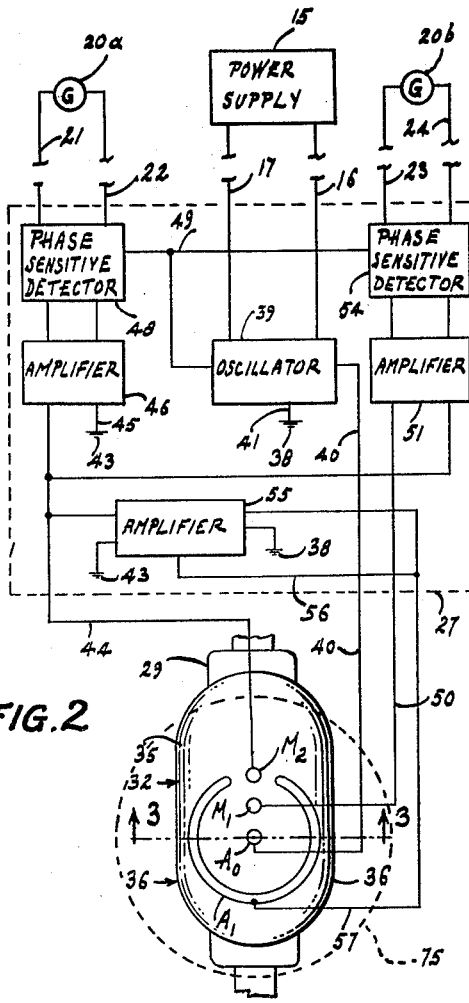
Fig. 2 is a schematic diagram of the apparatus of Fig. 1, showing the electrode carrier in front elevation.
Figure 3:
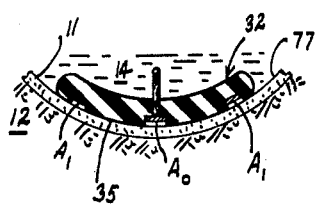
Fig. 3 is a cross sectional view of the electrode carrier of Fig. 2, taken on the line 3—3 thereof.

As seen in Figs. 1–3, the carrier 32 conveniently has a generally cylindrical outer face 35 for conforming with the generally cylindrical wall of the borehole, the contact area of the outer face being of generally oval configuration elongated in a direction of the borehole axis. In order that the carrier may provide an insulating barrier between the volume of the adjacent formations being measured and the well fluid 14, the carrier, and particularly its face 35, is composed of an electrically insulating material such as rubber or a rubber substitute. Desirably, the carrier 32 is of flexible construction, its flexibility being enhanced, if desired, by a construction of the type shown in Patent No. 2,732,525, issued January 24, 1956, to A. Blanchard et al. The face 35 is thus adapted to conform to irregularities in the sidewall and to exclude well fluid from a region bounded by its perimeter 36. The transverse extent of the region bounded by the perimeter 36 is generally limited to an arcuate dimension on the order of one-quarter the borehole circumference, as an excessive transverse dimension may result in imperfect conformance to borehole wall sections of widely varying diameter.

Inlaid in the face 35 of carrier 32 inwardly of its periphery 36 is a main current-emitting electrode $A_0$ which suitably has a button-like configuration. The electrode $A_0$ is preferably disposed centrally of the transverse dimension of the carrier face but eccentrically with respect to the longitudinal dimension. Thus, the electrode $A_0$ is shown to be spaced midway between the side edges of the face 35 but closer to the bottom edge than to the top edge. A potential measuring electrode $M_1$ is shown to be inlaid in the face 35 at a point centrally disposed with respect to both the transverse and longitudinal dimensions of the face. Electrode $M_1$ can, like electrode $A_0$, be of button-like configuration.

Spaced about the inner current emitting electrode $A_0$ is an outer current emitting electrode $A_1$ and a potential measuring electrode $M_2$ inlaid in the face 35. Preferably, both the outer electrode $A_1$ and the measuring electrode $M_2$ have their locus in an equipotential surface which would result from flow of current from the inner current electrode $A_0$ to a remote current return point under ideal conditions. Practically, the locus of electrodes $A_1$ and $M_2$ may be substantially in the form of a circle centered upon the inner electrode $A_0$. The locus of the outer current electrode $A_1$ is, more particularly, substantially a complete circle, the circle being interrupted a short distance on either side of the measuring electrode $M_2$ which is thus surrounded by insulation. The outer current electrode $A_1$ extends near the periphery 36 of the carrier face leaving a minimum margin of insulation transversely of the outer current electrode $A_1$ so that its radius may be substantially a maximum for enhanced depth of investigation. The measuring electrode $M_2$, on the other hand, is preferably centered with respect to the transverse dimension of the carrier face 35 and spaced well inwardly from the upper and lower edges of the carrier face so as to have substantially an ideal electrical contact with the borehole wall free from the effects of conductive well fluid. It may be observed that the electrodes $A_0$, $A_1$, and $M_1$, $M_2$ are recessed slightly below the face 35 to prevent spurious electrical potentials which might result from their rubbing against the borehole wall. Electrical contact is then obtained through conductive well fluid entrapped in the recesses. Lead-in wires for the electrodes extend through the rear of the carrier.

The longitudinal spacings between the electrodes $A_0$ and $M_1$, $M_2$ may, for example, be as taught in Patents Nos. 2,669,688 and 2,669,690 issued February 16, 1954, to H. G. Doll, whereby resistivity measurements may be obtained of similar significance. As a result of such spacing, the measuring electrode $M_1$ may be positioned, for example, substantially midway between the electrodes $A_0$ and $M_2$ at the junction of the transverse and longitudinal axes of the face.

To pass current between the inner electrode $A_0$ and a remote ground return point 38, there is disposed in the cartridge 27 an oscillator 39 having its input terminals connected by cable conductors 16, 17 to the power supply 15 at the surface and its output terminals connected by insulated conductors 40, 41 to the inner electrode $A_0$ and the current return point 38, respectively. The oscillator 39, which may be of any suitable form, conveniently serves to supply a constant alternating current of desired frequency to the electrode $A_0$. The flow of current from the electrode $A_0$ results in a distribution of potentials across the face of the carrier 32 which is dependent upon variations in resistivity in the volume of formation opposite the carrier face. While this distribution of potentials may be employed in a variety of ways for deriving measure signals representing formation resistivity, conveniently the potential of the measuring electrode $M_2$ with respect to a remote reference point 43 is applied via insulated conductors 44, 45 to input terminals of an A.C. amplifier 46 of suitable design for supplying an amplified version of the electrode potential to the input of a phase sensitive detector 48. The detector 48 may be of any suitable design and, when sensitized by a reference signal supplied from oscillator 39 via conductor 49, serves to supply a linear, detected version of the amplifier output via cable conductors 21, 22 to a galvanometer $20a$ of the galvanometric recorder 20. The electrodes $A_0$ and $M_2$ constitute a two-electrode system and provide a measure signal which is often referred to as a "normal" or "micronormal" signal.

Simultaneously to obtain resistivity indications of a different character, the potential difference between the measuring electrodes $M_1$, $M_2$ is applied via insulated conductors 44, 50 to the input terminals of an amplifier 51, similar to amplifier 46, and supplying an amplified signal to a phase sensitive detector 54 similar to detector 48. The detector 54 has its reference input coupled by conductor 49 to the output of oscillator 39 and supplies a measure signal via cable conductors 23, 24 to galvanometer $20b$ which may comprise another channel of recorder 20. The measure signal supplied by detector 54 is often termed an "inverse" or "microinverse" signal, the electrodes $A_0$, $M_1$ and $M_2$ from which it is derived being termed a three-electrode system.

Because of the limited size of the carrier face 35, particularly in its width or transverse dimension, the distribution of potentials across the face tends to be distorted, even opposite homogeneous formations. In accordance with the present invention, such distortion is avoided by passing current from the open loop-shaped electrode $A_1$ in an amount which brings the potential of this electrode $A_1$ into substantial equality with the potential at a point in the vicinity of the electrode, such as at the measuring electrode $M_2$ which lies in the locus of the loop. To this end, the potential of measuring electrode $M_2$ with respect to a remote reference point, such as point 43, is applied to the input of a feedback amplifier 55, the feedback loop being indicated at 56. The output of amplifier 55 is a variable current supplied via insulated conductor 57 to outer electrode $A_1$ in phase with the potential of measuring electrode $M_2$ and returned at a remote current return point, such as point 38. While the amplifier 55 may have a variety of forms, suitably it has a relatively high gain G in its forward loop, a gain H which is substantially unity in the feedback loop, and a relatively low output impedance $R_0$.

Figure 4:
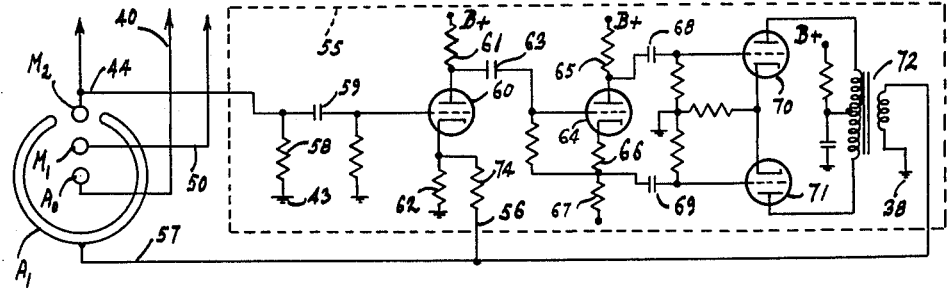
Fig. 4 is a circuit diagram corresponding to a portion of the apparatus of Fig. 2 utilized in controlling potential distribution.

One suitable form of the feedback amplifier 55 is shown in Fig. 4. As seen, the potential developed across input resistor 58 is coupled by capacitor 59 to the control electrode of a vacuum tube amplifying device 60 of the triode type. The triode 60 is connected as a voltage amplifying stage with its anode-cathode path in series with anode and cathode resistors 61, 62 connected between the B+ and ground terminals of a suitable power supply and has its anode coupled by capacitor 63 to the control electrode of a vacuum tube amplifying device 64 of the triode type serving as a phase inverter. The triode 64 has its anode-cathode path in series with anode resistor 65 and cathode resistors 66, 67 connected between the B+ and ground terminals of a suitable supply. The potentials with respect to ground at the anode of triode 64 and at the junction of cathode resistors 66, 67 are coupled in push-pull relation via capacitors 68, 69 to the control electrodes of vacuum tube amplifying devices 70, 71 of the triode type. The triodes 70, 71 are connected as a push-pull power amplification stage with the primary winding of output transformer 72. In order that the output impedance of the amplifier may be relatively low, output transformer 72 may be of a step down type, having relatively few turns in its secondary winding, which is connected between the current return point 38 and the outer current emitting electrode $A_1$. The potential developed across the secondary winding is supplied as a degenerative feedback signal via conductor 56 and feedback resistor 74 to the cathode of the input triode 60. Hence, the amplifier 55 comprises a voltage amplifying stage, a phase inverter stage and a push-pull power output stage, the feedback being applied to the voltage amplifying stage. By suitably selecting the values of resistors 74, 62, the desired gain H of the feedback loop may be obtained.

In a typical operation of the apparatus of Figures 1–4, the cable 13 is reeled to move the electrode carrier 32 past subsurface formations to be investigated, while the subsurface apparatus is electrically energized. A constant current of given phase and frequency is passed between the inner electrode $A_0$ and a remote current return point to produce a distribution of potentials about the face 35 of the electrode carrier dependent upon the resistivity characteristics of formations adjacent the electrode carrier.

While the face of the electrode carrier is resiliently urged into conforming physical contact with the borehole wall, separations between the carrier face and the borehole may occur in localized regions, especially in regions near the lateral edges of the carrier face. Since the borehole fluid tends to flow under pressure into any such regions of separation, thereby creating an anomalous region of low conductivity, the distribution of potentials in accordance with the previous practice would have been appreciably disturbed, giving rise to possible errors in the measurments obtained. However, by the present invention such disturbances in the potential distribution are minimized by emitting current from the outer electrode $A_1$ spaced about the inner current emitting electrode $A_0$ in an amount necessary to maintain the outer electrode at a potential substantially the same as the potential at an interior point of the carrier face. As this interior point preferably is disposed with the outer electrode in an ideal equipotential surface resulting from flow of current from the inner electrode in a homogeneous medium, the potential at which the outer electrode is maintained is conveniently that of the electrode $M_2$ which is spaced the same distance from the inner electrode $A_0$ as is the outer electrode $A_1$. Because the measuring electrode $M_2$ is spaced inwardly of the periphery of the carrier face in the vicinity of its center, little likelihood exists that the potential distribution in the immediate vicinity of the measuring electrode $M_2$ will be distorted. By reproducing this same potential at points along the equipotential surface in which the outer electrode $A_1$ lies, the same freedom from distortion of the potential distribution is promoted on every side of the inner electrode $A_0$.

It may be demonstrated, in fact, that a potential distribution is obtained by thus controlling the potential of the outer electrode, effectively corresponding to the potential distribution obtained under ideal conditions with an enlarged carrier face, the perimeter of which is indicated by the dashed circle 75 centered on the inner electrode $A_0$ (Fig. 2). Since, in practical usage, an electrode carrier having a face defined by the circle 75 could not be made to have good contact with the borehole wall, it will be appreciated that a substantial improvement is achieved through the present invention.

In order that the potential of the outer electrode $A_1$ may be maintained substantially equal to the potential of the measuring electrode $M_2$, the feedback amplifier 55 has an overall gain which is substantially unity, that is, its output potential $e_o$ is substantially equal to its input potential $e_i$. If the current supplied to the outer electrode $A_1$ is referred to as $i_1$, the following relationships hold:

(1) $$(e_i - He_o)G = e_o + R_o i_1$$

or (2) $$e_i = e_o\left(\frac{1+GH}{G}\right) + \frac{R_o i_1}{G}$$

where the terms of the expression are as defined above. By making the forward gain G of amplifier 55 relatively large and the output impedance $R_o$ relatively small, the second term of expression (2) may be negligibly small. Then, the output potential $e_o$ will be equal to the input potential $e_i$ when (3) $$H = 1 - \frac{1}{G}$$

Thus, by making the forward gain G relatively large and the feedback loop gain H substantially unity, the relationship (3) is satisfied and, consequently, the potentials with respect to ground of the ring-like electrode $A_1$ and of the measuring electrode $M_2$ continuing the ring are caused to be substantially equal.

As a function of the depth of the electrode carrier in the borehole, a record is obtained by the recorder 20 providing simultaneous indications of the normal signal derived from the two electrode system $A_0$, $M_2$ and of the inverse signal derived from the three electrode system $A_0$, $M_1$ and $M_2$. By suitably spacing the measuring electrodes $M_1$ and $M_2$ from the current emitting electrode $A_0$, the recorded signals may be caused to have a separation in values opposite a mud cake 77, such as is formed inwardly of a permeable formation, thereby to delineate permeable strata.

While the measuring electrode $M_2$ is conveniently employed both for determining the potential of the current emitting electrode $A_1$ and for picking up potentials representative of formation resistivity, a separate measuring electrode may, if desired, be spaced nearer to or further from the inner current emitting electrode $A_0$. As shown in the aforementioned Doll patents, the measuring electrodes need not have a button-like configuration but may, for example, be of circular configuration. Less or more measuring electrodes may be employed in accordance with the desired number of investigation characteristics represented in the recordings obtained.

Figure 5:
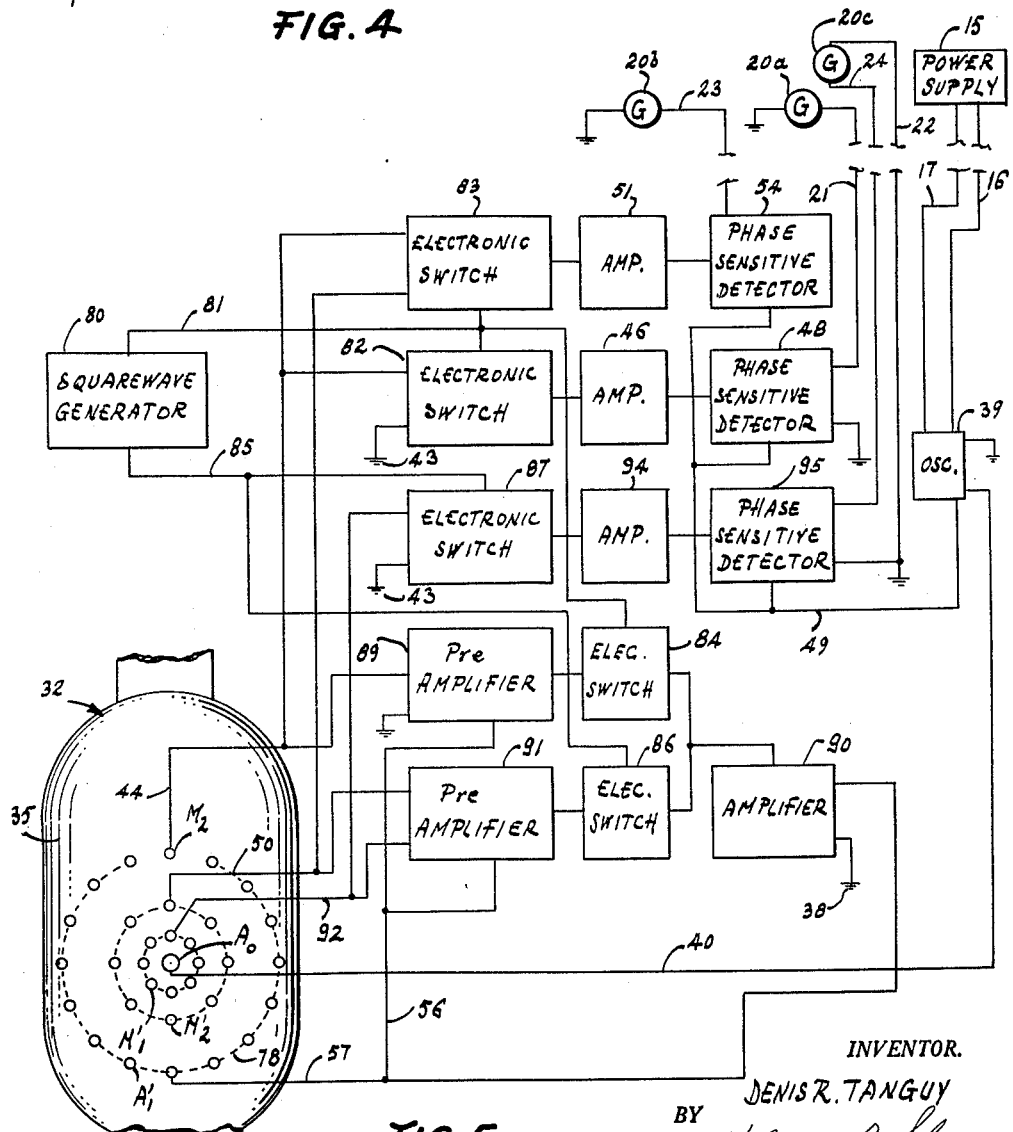
Fig. 5 is a schematic diagram of an electrical well logging system in accordance with another embodiment of the invention.

Resistivity indications representing essentially different investigation characteristics may be obtained using apparatus in accordance with the invention of the type shown in Fig. 5. In this embodiment of the invention, the inner electrode $A_0$ and the measuring electrode $M_2$ are inlaid in the carrier face 35 in the same manner as previously described. However, a modified outer current emitting electrode $A_1'$ is employed which consists of exposed button-like segments spaced in an open loop or ring and maintained at the same potential by an insulated jumper 78. In lieu of the measuring electrode $M_1$, concentric measuring electrodes $M_1'$ and $M_2'$ are inlaid in the carrier face 35 at successively greater spacings from the inner electrode $A_0$. The measuring electrodes $M_1'$, $M_2'$ may have a segmental construction similar to that of outer current emitting electrode $A_1'$ but preferably define a pair of closed loops about the inner electrode. Since the segments of a given electrode are maintained at the same potential, lead-in wire connections may be made at any point therealong.

Constant current is supplied from oscillator 39 to the inner electrode $A_0$ in the same manner as described above. However, the system is arranged for deriving resistivity indications of the type described in H. G. Doll Patent No. 2,712,629, issued July 5, 1955, alternately with the resistivity indications of the type obtained with the preceding embodiment of this invention. To provide for these alternations in the character of the resistivity measurements obtained, a square wave generator 80, which may, for example, be a free running multivibrator, has a first control line 81 connecting with a first set of electronic switches 82, 83 and 84 and a second control line 85 connecting with a second set of electronic switches 86, 87. The electronic switches may be of similar design incorporating, for example, diodes or the like which may be driven by the output of the square wave generator between a conductive and a non-conductive state so that, in alternation, signals through the first set of electronic switches may be blocked while those through the second set of switches are transmitted, and vice versa.

The electronic switch 82 is connected between the measuring electrode $M_2$ and the amplifier 46 alternately to block and to transmit the potential of the measuring electrode $M_2$ with respect to ground via conductor 21 for recording as a normal signal by galvanometer 20a. The potential difference between the measuring electrodes $M_2$ and $M_2'$ is coupled via electronic switch 83 to the amplifier 51 so that the inverse signal applied via conductor 23 to the galvanometer 20b is similarly reduced periodically to zero in the same phase relation as the normal signal. However, the galvanometers 20a and 20b conveniently have a time constant such that they indicate continuously the average value of the normal and inverse signals.

Electronic switch 84 which is operated in synchronism with switches 82 and 83 couples a preamplifier 89 to the input of a power amplifier 90, amplifiers 89, 90 being employed in lieu of the amplifier 55 of Figs. 2 and 4. Whereas the preamplifier 89 may represent a single stage of voltage amplification to raise the potential of the measuring electrode $M_2$ to a suitable level for switching, the amplifier 90 may include both voltage and power amplification in the same manner as the amplifier 55 of Fig. 4. However, the feedback loop is completed by connection of the conductor 56 to an appropriate point in the preamplifier 89, such as to the cathode of an amplifying device connected in the same manner as the triode 60 of Fig. 4.

The electronic switch 86 of the second set couples a preamplifier 91 to the input of amplifier 90 alternately with coupling of the preamplifier 89 through switch 84. The input terminals of preamplifier 91 are connected by insulated conductors 92, 50 to the measuring electrodes $M_1'$ and $M_2'$, respectively, so as to be responsive to the potential difference or potential gradient between these measuring electrodes. While the preamplifier 91 may be arranged similarly to preamplifier 89 for response to the feedback signal applied via conductor 56, desirably the feedback loop gain $H_1$ with respect to the preamplifier 91 is relatively small and substantially less than unity, so that the overall gain of the preamplifier 91 and amplifier 90 is relatively high and greatly in excess of unity.

By means of conductor 92 the potential with respect to ground point 43 of a point in the vicinity of the inner electrode, such as that of measuring electrode $M_1'$, is supplied to the input terminals of electronic switch 87 for transmission, when the switch is effectively closed, to the input of amplifier 94, similar to amplifiers 46 and 51. The output of amplifier 94 is, in turn, applied to the input of a phase sensitive detector 95 similar to detectors 48 and 54 and sensitized by application of a reference signal from oscillator 39 to its reference signal input. The detected version of the electrode potential is transmitted via cable conductors 22, 24 to a third galvanometer 20c which may constitute a third channel of the galvanometric recorder 20. Thus, resistivity indications representing three different investigation characteristics may be recorded simultaneously.

In an exemplary operation of the apparatus of Fig. 5, the electrode carrier together with the cartridge containing the subsurface electronic equipment is moved past formations to be investigated while energized by electric power from the surface. During alternate intervals when the square wave generator 80 places the first set of electronic switches 82, 83, 84 in transmitting condition, a potential distribution is created by a flow of current from the inner electrode $A_0$ similar to that obtained with the apparatus of Figs. 1–4. That is, the outer current emitting electrode $A_1'$ is brought to the same potential with respect to a remote reference point as exists at the measuring electrode $M_2$ by virtue of the overall unity gain of the current control loop including preamplifier 89, electronic switch 84 and amplifier 90. The current emitted by the outer electrode $A_1'$ to achieve equality of potential is conveniently in phase with the current emitted from electrode $A_0$ and commonly has a substantially lower value than the current emitted from the inner electrode. During these alternate intervals when the electrodes $M_2$ and $A_1'$ are at the same potential, a detected version of the potential of measuring electrode $M_2$ with respect to ground is supplied to galvanometer 20a for obtaining indications of formation resistivity in accordance with the normal signal. Simultaneously, indications are provided by galvanometer 20b of the detected version of the potential difference between measuring electrodes $M_2$ and $M_2'$, representing formation resistivity in accordance with the inverse signal. Accordingly, indications of formation resistivity are obtained during these alternate intervals in accordance with two different investigation characteristics.

During the remaining alternate intervals, the square wave generator 80 serves to place the second set of electronic switches 86, 87 in transmitting condition and to block signal transmission through the first set of switches 82, 83, 84. The current output from amplifier 90 is then determined in accordance with the potential gradient between the inner and outer electrodes picked up by measuring electrodes $M_1'$ and $M_2'$ and supplied to the input of preamplifier 91. Because the overall gain of preamplifier 91 and amplifier 90 is relatively high, the current emitted from the outer electrode $A_1'$ tends to diminish the potential difference between the measuring electrodes $M_1'$, $M_2'$ substantially to zero. That is, the current emitted from the outer electrode $A_1'$ is of the same phase as current emitted from the inner electrode $A_0$ and has a magnitude adjusted automatically to diminish the potential difference between the measuring electrodes $M_1'$ and $M_2'$ in accordance with the overall gain of the feedback loop constituted by the preamplifier 91 and amplifier 90. The interior feedback loop which is provided by connection of conductor 56 appropriately in preamplifier 91 serves to stabilize the gain and phase shift characteristics of the preamplifier 91 and amplifier but does not appreciably diminish the forward gain of the amplifiers. Under these conditions, galvanometer 20c, which is responsive to the detected version of the potential of electrode $M_1'$ with respect to remote reference point 43, provides indications of formation resistivity characterizing a relatively deeper investigation than that provided when the outer electrode $A_1'$ is maintained at the same potential as measuring electrode $M_2$. The contrasting investigation characteristics achieved in the alternate intervals are more fully described in the above-mentioned H. G. Doll Patent No. 2,712,629.

While representative embodiments of the invention have been illustrated and described, it will be apparent that the invention is susceptible to other modifications lying within its true scope and principles. Thus, the configurations of the electrode carrier and of the electrodes are subject to considerable variations in addition to those illustrated. For example, it may be desirable to impart a non-circular loop-shape to the outer current emitting electrode $A_1'$ as where the inner electrode $A_0$ has a non-circular outline. While the current emitted from the inner electrode $A_0$ is conveniently maintained constant, this current may be permitted to vary so that resistivity indications are obtained by determining the ratio between the measured potential and the current emitted from the inner electrode or, if desired, the measured potential may be maintained constant and the magnitude of a current supplied to the inner electrode $A_0$ measured to provide indications of formation conductivity. Rather than providing visual indications of the measure signals as a function of depth, the measure signals may be recorded on magnetic tape or the like or processed in a computer from which is derived signals representing a computed function of the measure signals.

In regard to the embodiment of Fig. 5, the different resistivity investigating systems which are shown to be operated sequentially may instead be operated simultaneously by using different frequencies or different phases so that respective signals may be distinguished by their time characteristics.

As the invention is susceptible to these and other modifications, its scope is not to be restricted to the embodiments illustrated and described but is as defined in the appended claims.

I claim:

1. In apparatus for investigating earth formations traversed by a borehole, the combination comprising an electrode carrier having an insulating face, a plurality of electrodes inlaid in said face including an inner current emitting electrode, an outer current emitting electrode spaced about said inner electrode to define a desired equipotential surface and a potential measuring electrode located on said equipotential surface, means for passing current from said inner electrode into the adjacent earth formation, the flow of this current serving to establish a potential field across said face, means for passing current from said outer electrode to make its potential with respect to a common reference point substantially equal to the potential of potential measuring said electrode, and means responsive to said potential field for producing a signal which is a function of formation resistivity.

2. In apparatus for investigating earth formations traversed by a borehole, the combination comprising an electrode carrier having an insulating face, a plurality of electrodes inlaid in said face including an inner current emitting electrode, an outer current emitting electrode spaced about said inner electrode to define a desired equipotential surface and a potential measuring electrode located on said equipotential surface, means for passing current from said inner electrode into the adjacent earth formation, the flow of this current serving to establish a potential field across said face, means for passing current between said outer electrode and a relatively remote current return point to make the potential of said outer electrode with respect to a common reference point substantially equal to the potential of said potential measuring electrode, and means responsive to said potential field for producing a signal which is a function of formation resistivity.

3. In apparatus for investigating earth formations traversed by a borehole, the combination comprising an electrode carrier having an insulating wall contacting face, a plurality of electrodes inlaid in said face including an inner current emitting electrode, an outer current emitting electrode spaced about said inner electrode to define a desired equipotential surface and a potential measuring electrode located on said equipotential surface and spaced farther from the edge of said face than said outer electrode but substantially the same distance from said inner electrode, means for passing current from said inner electrode into the adjacent earth formation, the flow of this current serving to establish a potential field across said face, means for passing current between said outer electrode and a relatively remote current return point to make the potential of said outer electrode with respect to a common reference point substantially equal to the potential of said potential measuring electrode, and means responsive to said potential field for producing a signal which is a function of formation resistivity.

4. In apparatus for investigating earth formations traversed by a borehole, the combination comprising an electrode carrier having an insulating wall contacting face, a plurality of electrodes inlaid in said face including an inner current emitting electrode, an outer arcuate current emitting electrode concentric with said inner electrode and a potential measuring electrode lying on a circle defined by said arcuate outer electrode and spaced centrally of said carrier face, means for passing current between said inner electrode and a remote current return point, the flow of this current serving to establish a potential field across said face, means for passing current between said outer electrode and a remote current return point to make the potential of said outer electrode with respect to a common reference point substantially equal to the potential of said potential measuring electrode, and means responsive to said potential field for producing a signal which is a function of formation resistivity.

5. In apparatus for investigating earth formations traversed by a borehole, the combination as defined in claim 4, wherein said signal producing means is responsive to the potential of said potential measuring electrode with respect to a remote reference point.

6. In apparatus for investigating earth formations traversed by a borehole, the combination comprising an electrode carrier having an insulating wall contacting face, a plurality of electrodes inlaid in said face including an inner current emitting electrode, an outer current emitting electrode spaced about said inner electrode to define a desired equipotential surface and a potential measuring electrode located on said equipotential surface, means for passing current from said inner electrode into the adjacent earth formation, the flow of this current serving to establish a potential field across said face, amplifier means having substantially a unity gain responsive to the potential with respect to a reference point of said potential measuring electrode for passing current from said outer electrode to a remote current return point, and means responsive to said potential field for producing a signal which is a function of formation resistivity.

7. In apparatus for investigating earth formations traversed by a borehole, the combination as defined in claim 6, wherein said amplifier means has a relatively high forward gain and substantially a unity feedback gain, together with a relatively low output impedance.

8. In apparatus for investigating earth formations traversed by a borehole, the combination comprising an electrode carrier having an insulating wall contacting face, a plurality of electrodes inlaid in said face including an inner current emitting electrode, an outer current emitting electrode spaced about said inner electrode and a potential measuring electrode lying in the locus of said outer electrode, means for passing current between said inner electrode and a remote current return point, the flow of this current serving to establish a potential field across said face dependent upon the resistivity of adjacent formations, amplifier means having substantially a unity gain responsive to the potential with respect to a reference point of said potential measuring electrode for passing current between said outer electrode and a remote current return point, and means responsive to the potential of said potential measuring electrode with respect to a reference point for producing a signal which is a function of formation resistivity.

9. In apparatus for investigating earth formations traversed by a borehole, the combination comprising an claim 8, further comprising means responsive to the potential difference between said first mentioned potential measuring electrode and a second potential measuring electrode spaced intermediate said first potential measuring electrode and said inner electrode for producing another signal which is a function of formation resistivity, said potential measuring electrodes being aligned with said inner electrode for orientation longitudinally of said borehole.

10. In apparatus for investigating earth formations traversed by a borehole, the combination comprising an electrode carrier having an insulating wall contacting face, a plurality of electrodes inlaid in said face including an inner current emitting electrode, an outer current emitting electrode concentric with said inner electrode, and a potential measuring electrode disposed on a circle defined by said outer electrode and spaced centrally of said carrier face, means for passing current between said inner electrode and a remote current return point to establish a potential field across said face, amplifier means for passing current between said outer electrode and a remote current return point, said amplifier means being responsive during first alternate intervals to the potential of said measuring electrode with respect to a remote reference point and having substantially a unity gain, said amplifier means being responsive during second alternate intervals to the potential gradient between said inner and outer electrodes and having a relatively high gain, whereby the potentials of said outer electrode and said measuring electrode are substantially equal during first intervals and the potential gradient between said inner and outer electrodes is substantially zero during second alternate intervals, and means responsive to said potential field during first and second intervals for producing respective signals which are a function of formation resistivity characterized by the different potential fields during said alternate intervals.

11. In apparatus for investigating earth formations traversed by a borehole, the combination comprising a housing, an electrode carrier having an insulating face conformable to the borehole wall, means for supporting said carrier on said housing and for resiliently urging said carrier face into contact with the borehole wall, said face having a generally oval periphery with the longer dimension adapted to extend along the borehole, and a plurality of electrodes inlaid in said face including an inner current emitting electrode of button-like configuration positioned along the longitudinal axis of said face and spaced from the transverse axis, an outer current emitting electrode of ring-like configuration defining a circle concentric with said inner electrode, and a potential measuring electrode centrally located on said carrier face on the circle defined by said outer electrode but electrically insulated from such outer electrode.

12. In apparatus for investigating earth formations traversed by a borehole, the combination as defined in claim 11, wherein said potential measuring electrode is of button-like configuration and said outer current emitting electrode comprises a plurality of button-like segments spaced along said circle and an insulated conductor connecting said segments.

13. In apparatus for investigating earth formations traversed by a borehole, the combination as defined in claim 11, further comprising feedback amplifier means having its input terminals connected to said potential measuring electrode and a remote reference point and its output terminals connected to said outer electrode and to a remote current return point, said feedback amplifying means having an overall gain of substantially unity.

14. In apparatus for investigating earth formations traversed by a borehole, the combination comprising an electrode carrier having an insulating face conformable to the borehole wall and a plurality of electrodes affixed to said face and including an inner current-emitting electrode located in the central region of said face, an outer current-emitting electrode encircling said inner electrode, and a potential measuring electrode located in a gap in the outer electrode and electrically insulated therefrom, said electrodes being positioned on said face so that the potential measuring electrode is also located in the central region thereof.

References Cited in the file of this patent

UNITED STATES PATENTS

| | | |
|---|---|---|
| 2,669,688 | Doll | Feb. 16, 1954 |
| 2,712,629 | Doll | July 5, 1955 |
| 2,712,631 | Ferre | July 5, 1955 |
| 2,750,557 | Bricand | June 12, 1956 |